Feb. 6, 1940.  R. G. LE TOURNEAU  2,189,072
TRACTOR AND IMPLEMENT UNIT
Filed March 4, 1938
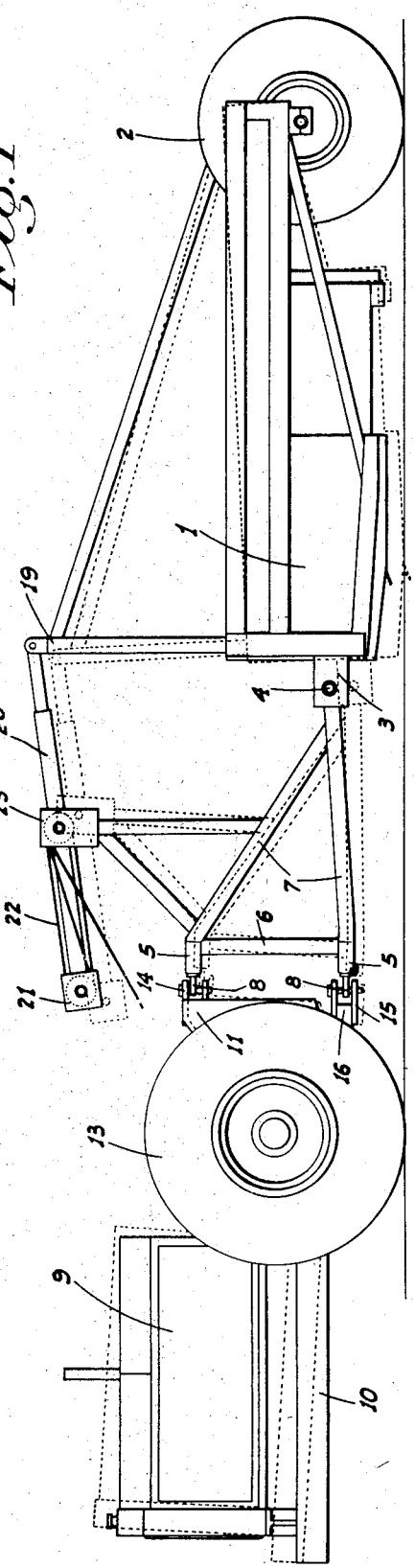
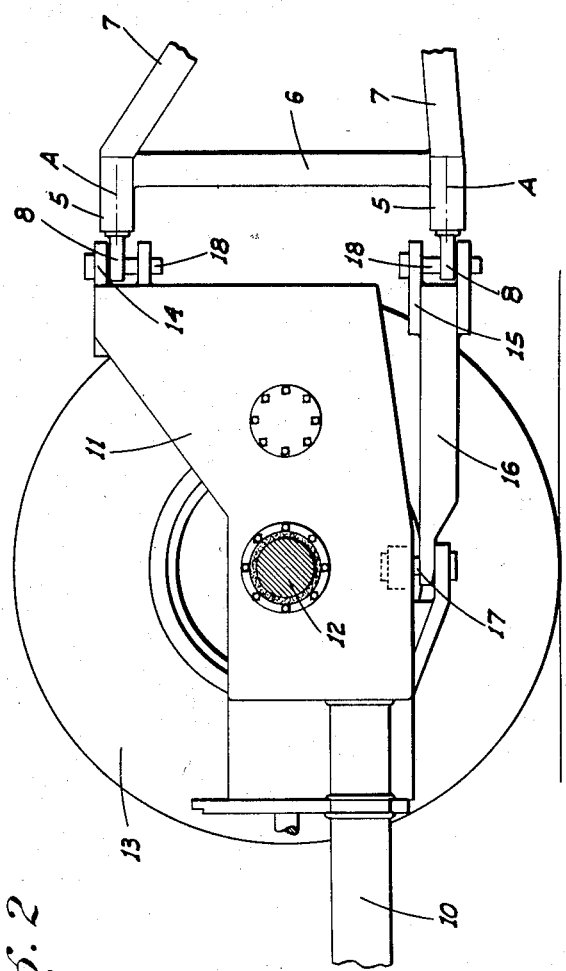
INVENTOR
*R. G. Le Tourneau*
BY
ATTORNEY Patented Feb. 6, 1940

2,189,072

UNITED STATES PATENT OFFICE 2,189,072

TRACTOR AND IMPLEMENT UNIT

Robert Gilmore Le Tourneau, Peoria, Ill., assignor to R. G. Le Tourneau, Inc., a corporation of California Application March 4, 1938, Serial No. 193,913

16 Claims. (Cl. 37—126)

This invention relates to tractor drawn vehicles or implements and particularly to large capacity carrying scrapers. Heretofore, such scrapers have been mounted on front and rear sets of wheels, the former being steerable and operatively connected to a conventional tractor so as to be steered or turned as the tractor turned.

It is the principal object of this invention to provide a two wheel tractor, and a scraper or like implement having only a single set of supporting wheels, and to connect the tractor and implement as a unit in such a manner that the same may turn in a relatively short radius, the scraper may be raised, lowered or otherwise manipulated and controlled as readily as before.

A further object is to provide a novel means, associated with the connecting means, to permit of lateral tilting of the tractor relative to the implement as irregularities in ground contour may necessitate, without relying on loose play between the connecting parts.

Also, the unit as a whole is simpler and less expensive than the usual assembly of a self-supported implement and a self-supported or conventional tractor.

These objects I accomplish by means of such structure and relative arrangement of parts as will fully appear by a perusal of the following specification and claims.

In the drawing similar characters of reference indicate corresponding parts in the several views:

Figure 1 is a side outline of my novel tractor and scraper showing the latter in a load carrying position, and with the scraping position of the implement and the accompanying position of the tractor indicated in dotted lines.

Figure 2 is a side elevation of the transmission housing of the tractor and the scraper coupling structure mounted thereon.

Referring now more particularly to the characters of reference on the drawing, the scraper depicted is of the same type as shown in my Patent No. 2,112,105, dated March 22, 1938, except that the front wheel truck and accompanying connecting parts including the draft tongue are eliminated. The scraper as now constituted comprises a rigid body 1 in which the scraping and dirt moving instrumentalities are mounted, the body at its rear end being supported on wheels 2.

At its front end, the body is provided near the bottom with side ears 3 which support the pivot pins 4 of the forwardly projecting draft unit. This unit includes hollow substantially horizontal and parallel members 5 spaced vertically apart a considerable distance, and conected by a vertical brace beam 6. The members 5 are also rigid with a rearwardly projecting beam structure 7 pivoted at its rear end on pins 4.

Projecting forwardly from members 5 are alined draft eyes 8, which are swively mounted in said members for rotation about axes A disposed lengthwise of members 5 in the same manner as shown in my Patent No. 1,983,860, dated December 11, 1934.

The tractor 9 includes side frames 10 on which the power plant is mounted and which at their rear end are rigid with the transmission housing 11, which also forms part of the tractor frame. This housing, besides the transmission mechanism, supports the separate wheel axles 12 on which the wheels 13 are mounted.

The transmission, like those of the conventional "track laying" tractors, is arranged so that either wheel can be driven, halted or reversed at the option of the operator, so that the tractor can swing horizontally about either wheel. Also, of course, the tractor is capable of tilting in a vertical plane about the wheel axles as an axis.

At its rear end at the top, which is above the wheel center, the housing 11 is provided with a rigid clevis 14, the spacing of the ears of which is greater than the thickness of the upper draft eye 8 which is adapted to project between said ears.

Disposed a similar distance below the wheel center is another clevis 15 to receive the lower draft eye 8, and the spacing between the ears of which is also greater than the thickness of the eye. Clevis 15 is mounted on the rear end of a drawbar 16 which at its forward end is pivoted on the housing on its under side as at 17 for swinging movement in a horizontal plane; the pivotal axis intersecting the wheel axis.

The eyes 8 are swively connected to the clevises by king pins 18 which are in axial alinement with each other normally, or when the drawbar is in a direct fore and aft position. The spacing between the draft eyes relative to the normal spacing of the clevises is such that said eyes are normally close to the top of clevis 14 and to the bottom of clevis 15 as shown in Fig. 2.

By reason of this arrangement, and due to the swinging drawbar and to the swively mounted draft ears, the tractor or scraper may tilt laterally relative to each other without severe binding or torsional strains being set up. This is because the drawbar may swing laterally relative to the tractor so as to maintain the clevis end of the bar in line with the rigidly connected but swively mounted draft ears. These ears, with the lengthening of the straight line distance between the clevises caused by the swinging of the draft bars, slide on the king pins, any tilt of the rigid tongue unit in a transverse plane relative to the tractor being taken care of by the swivelling of the draft eyes in their mountings. The tractor turns horizontally relative to the scraper about pins 18 as an axis.

The tractor and tongue unit can of course rock in a longitudinal plane about the wheels as a fulcrum, while the scraper can likewise rock about wheels 2 as an axis; the tractor and scraper hinging about pins 4.

In order to control this rocking movement, the scraper body at its forward end is provided with an upwardly projecting auxiliary frame 19. Pivoted on and projecting forward from this frame is a compression beam 20 having a sheave-block 21 at its forward end over which a cable 22 passes. A cooperating sheave-block 23 is mounted rigid with the tongue in a position intermediate the ends of the beam 20, the cable passing between the sheave-blocks and then from the block 23 to a power unit (not shown) on the tractor so that as long as the cable is held taut, a rearward pressure is exerted on the beam and the front end of the scraper is held at a desired level relative to the ground.

It is to be understood that while I have shown and described a specific type of scraper, and a specific means for controlling the level of the latter, the invention is not limited to such specific form of implement or control thereof, since the particular type of tractor and draft unit may be coupled to various other types of implements or vehicles to advantage in many cases.

It will be noted that the greatest weight of the tractor is ahead of the wheels 13. This is a valuable feature in that it acts as a counterbalance for the forward portion of the scraper, and takes considerable strain off the level controlling cable 22 and the parts directly associated therewith.

It will also be seen that by the use of the single pair of supporting and driving wheels not only is the entire weight of the tractor taken by said wheels, but a considerable portion of the weight of the scraper and its load as well. As a result, the wheels can exert a much greater tractive effort than an ordinary tractor of greater weight, which is increased as the scraper becomes loaded. A very heavy cut and load may therefore be effectively handled without the wheels slipping.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination as a unit, a vehicle body having a set of supporting wheels arranged to enable the body to tilt at its forward end about the wheels as an axis, a tractor having a pair of wheels about which the tractor may tilt, a draft unit connected to the tractor and inflexible in relation thereto as to movement in a vertical plane and pivoted at its rear end on the front end of the body for relative tilting movement in a vertical longitudinal plane and means between the draft unit and body to control the tilting of the body.

2. In combination as a unit, a vehicle body having a set of supporting wheels arranged to enable the body to tilt at its forward end about the wheel as an axis, a tractor having a pair of wheels about which the tractor may tilt, a draft unit pivoted at its rear end on the front end of the body for relative tilting movement in a vertical longitudinal plane, means between the draft unit and body to control the tilting of the latter, and means mounting the unit on the tractor rearwardly of the wheel center for swivel movement in a horizontal plane but against relative movement in a vertical plane.

3. In combination as a unit, a vehicle having supporting wheels, a two-wheel tractor ahead of the vehicle, a draft unit between the vehicle and tractor, means pivoting the unit on the vehicle for relative tilting movement in a vertical plane, means mounting the unit on the tractor rearwardly of the wheel center for swivel movement in a horizontal plane but rigid with the tractor against relative movement in a vertical plane and means to control such relative tilting of the vehicle and unit.

4. A tractor and draft unit comprising a tractor frame, a pair of alined wheels on opposite sides of and supporting the frame, a rigid draft unit projecting rearwardly from the frame and adapted at its rear end for connection with a vehicle, said unit including vertically spaced members at the forward end of the unit and draft eyes projecting forwardly from said members; vertically spaced clevises on the frame rearwardly of the wheel center engaging said eyes and king pins through said clevises and eyes; the eyes being mounted on the members for swivel movement relative thereto in a horizontal plane and one of said clevises being mounted on the tractor frame for lateral shifting movement.

5. A tractor and draft unit comprising a tractor frame, a pair of alined wheels on opposite sides of and supporting the frame, a rigid draft unit projecting rearwardly from the frame and adapted at its rear end for connection with a vehicle, said unit including vertically spaced members at the forward end of the unit and draft eyes projecting forwardly from said members, said eyes being mounted on the members for swivel movement relative thereto in a horizontal plane, a clevis rigid with the frame rearwardly of the wheel center engaging the upper eye, another clevis engaging the lower eye, separate vertical pins connecting the respective eyes and clevises, a drawbar rigid with and projecting forwardly from the last named clevis, and a vertical pivot connection between the forward end of the drawbar and the tractor frame.

6. A structure as in claim 5, in which said drawbar is below the wheel center and the axis of said vertical pivot intersects the axial line of the wheels.

7. A tractor and draft unit comprising a tractor frame, a pair of alined wheels on opposite sides of and supporting the frame, a rigid draft unit projecting rearwardly from the frame and adapted at its rear end for connection with a vehicle, said unit including vertically spaced members at the forward end of the unit, instrumentalities connecting the forward ends of said members and the tractor frame rearwardly of the wheel center and arranged to allow of relative swivel movement of the unit and frame in a horizontal plane while maintaining the frame and unit rigid in a vertical plane and means mounting one of said instrumentalities for relative shifting movement in a lateral direction.

8. In combination, an implement having a wheel supported frame tending of its own weight to tilt downwardly at its front end, a wheel supported power plant ahead of the implement tending, due to weight distribution, to tilt upwardly rearwardly of the wheel axis, means connecting the power plant and frame at their adjacent ends for relative tilting movement in a vertical plane and means to control such tilting movement.

9. In combination, an implement having a frame, wheels supporting the frame and about which the latter may tilt, and positioned so that the frame tends to drop at its front end, a pair of front wheels ahead of the frame, a power plant directly and tiltably supported by and driving said front wheels and positioned relative thereto so as to tend to lift rearwardly of the corresponding wheels, means connecting the power plant and frame for relative tilting movement in a vertical plane, and means applied between the connecting means and frame to control the tilting movement.

10. In combination, an implement having a frame, wheels supporting the frame and about which the latter may tilt in a vertical plane, a pair of front wheels ahead of the frame, a power plant tiltably supported by and driving said front wheels, means connecting the power plant and frame for relative tilting movement in a vertical plane and means to control the tilting movement.

11. A tractor and draft unit comprising a tractor frame, a pair of alined wheels on opposite sides of and supporting the frame, a rigid draft device projecting rearwardly from the frame and adapted at its rear end for connection with a vehicle, said device including vertically spaced members at the forward end thereof and swivel units connecting said members and the rear end of the tractor frame, one of said units being mounted on said frame for lateral shifting movement.

12. A tractor and draft unit comprising a tractor frame, a pair of alined wheels on opposite sides of and supporting the frame, a rigid draft device projecting rearwardly from the frame and adapted at its rear end for connection with a vehicle, said device including vertically spaced members at the forward end thereof and swivel units connecting said members and the rear end of the tractor frame, a draw-bar projecting forwardly from one of said units and a vertical pivot connection between the forward end of the draw-bar and the tractor frame.

13. A tractor and draft unit comprising a tractor frame, a pair of alined wheels on opposite sides of and supporting the frame, a rigid draft device projecting rearwardly from the frame and adapted at its rear end for connection with a vehicle, said device including vertically spaced members at the forward end thereof and swivel units connecting said members and the rear end of the tractor frame, a draw-bar projecting forwardly from the lower unit below the wheel center and a vertical pivot connection between the draw-bar at its forward end and whose axis substantially intersects the axial line of the wheels.

14. In combination, an implement, wheels supporting the implement rearwardly of its forward end and about which the latter may tilt in a vertical plane, a pair of front wheels ahead of the implement, a power plant tiltably supported by and driving said front wheels, means connecting the power plan and implement for relative tilting movement in a vertical plane and comprising a rigid draft unit connected to the power plant and inflexible in relation thereto as to movement in a vertical plane and pivoted at its rear end on the implement at the forward end thereof, a longitudinal beam above the unit, means mounting the beam at its rear end on the implement above the point of pivotal connection of the draft unit therewith, and control means applied to said beam to exert pressure on the beam in a rearward direction and preventing uncontrolled forward movement thereof.

15. In combination, an implement, wheels supporting the implement rearwardly of its forward end and about which the latter may tilt in a vertical plane, a pair of front wheels ahead of the implement, a power plant tiltably supported by and driving said front wheels, means connecting the power plant and implement for relative tilting movement in a vertical plane and comprising a rigid draft unit connected to the power plant and inflexible in relation thereto as to movement in a vertical plane and pivoted at its rear end on the implement at the forward end thereof, a longitudinal beam above the unit, means mounting the beam at its rear end on the implement above the point of pivotal connection of the draft unit therewith, a member rigid with and above the draft unit and a controllable tension element connecting said member and the beam ahead of the same.

16. In combination, an implement, wheels supporting the implement rearwardly of its forward end and about which the latter may tilt in a vertical plane, a pair of front wheels ahead of the implement, a power plant tiltably supported by and driving said front wheels, means connecting the power plant and implement for relative tilting movement in a vertical plane and comprising a rigid draft unit connected to the power plant and inflexible in relation thereto as to movement in a vertical plane and pivoted at its rear end on the implement at the forward end thereof, a longitudinal beam above the unit, means mounting the beam at its rear end on the implement above the point of pivotal connection of the draft unit therewith, a pulley rigid with the draft unit and mounted on a level adjacent that of the beam, a pulley mounted on the beam adjacent its forward end and a control cable operable from the power plant extending therefrom to and between the pulleys.

ROBERT G. LE TOURNEAU.